May 29, 1951 J. W. SMITH 2,554,507
CIPHERING DEVICE
Filed Aug. 11, 1947
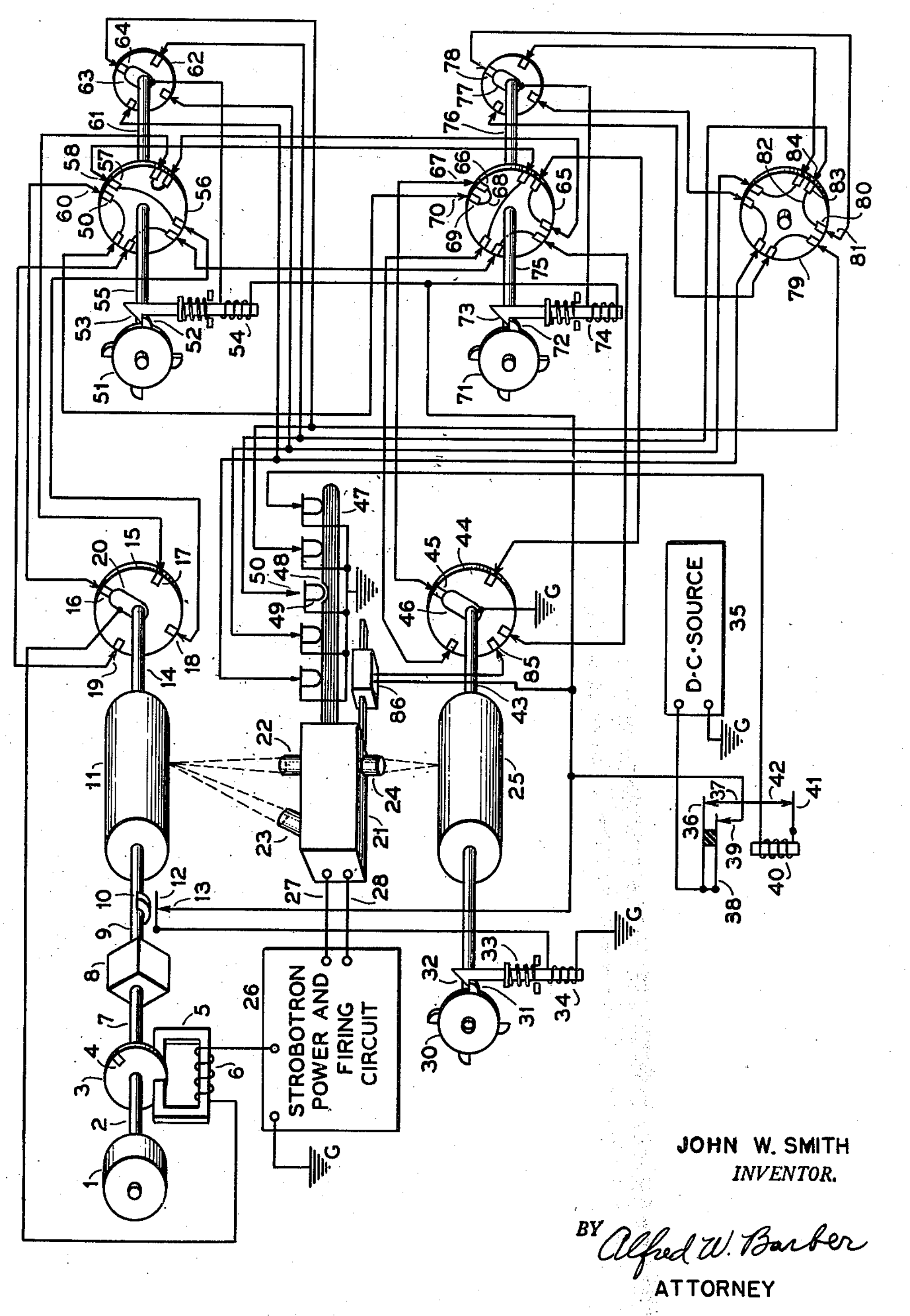
JOHN W. SMITH
*INVENTOR.*
BY Alfred W. Barber
ATTORNEY Patented May 29, 1951

2,554,507

UNITED STATES PATENT OFFICE 2,554,507

CIPHERING DEVICE

John W. Smith, Long Island City, N. Y., assignor to Faximile, Inc., New York, N. Y., a corporation of Delaware Application August 11, 1947, Serial No. 767,996

1 Claim. (Cl. 88—24)

The present invention concerns graphic privacy systems and, in particular, devices for automatically enciphering graphic material.

The term facsimile is used to denote the art of reproducing graphic material at a distant point by electrical means. The conventional facsimile system includes a pick-up scanner which translates density variations in a subject copy into electrical variations which may be transmitted to a distant point. At the reproducing end the electrical variations representing the subject copy density variations are recorded in a manner to produce a faithful reproduction of the original copy. Almost any type of graphic material consisting of pictures, text, etc., may be reproduced by facsimile methods. Facsimile is useful in military operations since a great variety of necessary material may be transmitted from point to point. Maps are one example of useful types of material which may be reproduced at a distant point for military purposes. However, transmission of facsimile signals over radio channels may give an enemy an opportunity to intercept and reproduce the material being transmitted. For this reason it is often highly important that a method be employed which will render the transmission secret.

The present invention concerns devices useful in rendering facsimile transmission secret. In the patent application of John V. L. Hogan et al. entitled "Graphic Privacy System," filed June 4, 1943, and bearing Serial Number 489,654, now Patent No. 2,437,255, issued March 9, 1948, a device has been described for reproducing graphic material a small area at a time in which the small areas are mixed according to a complex mechanically determined code. The original subject copy is attached to a rotatable drum and an optical system transfers a predetermined area of the copy to a second drum carrying a light sensitive sheet. The device of the present invention operates on the same general principle but provides simplified control devices for creating the coded mixing of the areas which are transferred from the subject copy to form the enciphered reproduction. Furthermore, the device of the present invention automatically creates a mechanically determined code of a high order of complexity. The subject copy is scanned in strips and a stroboscopically operated light source instantaneously transfers small areas from this strip to new locations on the recording sheet mixed according to a code determined by a number of coding switches.

One object of the present invention is to provide a device for automatically enciphering graphic material.

Another object of the present invention is to provide a device for enciphering graphic material at a relatively high rate of speed.

Still another object of the present invention is to provide a device for enciphering graphic material in which the coding may be readily changed.

A further object of the present invention is to provide a device for automatically enciphering graphic material according to a highly complex coding system.

A still further object of the present invention is to provide a relatively simple device which is capable of automatically enciphering graphic material according to a complex predetermined code.

These and other objects of the present invention will be apparent from the detailed description of the invention given in connection with the figure of the drawing.

The drawing shows a diagram of one form of the present invention.

The drawing shows a motor 1, turning copy drum 11, through shafts 2, 7, and 9 and gear box 8. Gear box 8 is a speed reducing gear arrangement having a ratio of four to one so that drum 11 turns at one quarter the speed of motor shaft 7. In the device shown, the circumference of the copy drum 11 is to be considered as divided into four parts solely for purposes of illustration. In most cases the circumference will be divided into a large number of parts, of the order of fifty to one hundred. The ratio of gear box 8 will, in general, be equal to the number of parts into which the circumference is divided. The original copy is attached to the surface of drum 11 and is transferred a small area at a time to the surface of drum 25. In order to effect the transfer, lamp house 21 is provided. A high speed flash lamp, not shown, is housed within lamp-house 21 and is supplied with energy over wires 27 and 28. Light from the high speed lamp is focused on the surface of drum 11 by means of lens system 23. The illuminated area on drum 11 is transferred to photo-sensitive paper or film mounted on drum 25, by means of lenses 22 and 24 also carried by lamp-house 21. Drum 11 is provided with a shaft extension 14 carrying switch rotor 20 which makes successive contacts with switch points 16, 17, 18 and 19 of switch 15. Drum 25 carries a shaft extension 43 with switch arm 46 which makes successive contacts to such switch points as 45 on switch body 44. Drum 11 is rotated continuously by motor 1 while drum 25 is moved a step at a time by ratchet motor 30—32.

In order to transfer the image of a predetermined area from drum 11 to drum 25, the strobotron lamp in lamp box 21 is fired. For each position of drum 25 the strobotron firing circuit is completed through switches 44 and 15 through associated arms and contacts. The particular contact which completes the circuit depends upon the position of key-block switches 56 and 65. The manner in which the key switches are connected together and the manner in which they are rotated determines the particular sequence of mixing of the areas as they are transferred from drum 11 to drum 25. The various switches in the drawing are shown in a position to complete the strobotron power and firing circuit. The impulse to fire the strobotron is generated by the passage of magnetic slug 4 in disc 3 between the poles of magnet 5. Coil 6 picks up this impulse which it passes to the strobotron power firing circuit 26 whenever the coil circuit, on one end, is completed to ground. Tracing the circuit from coil 6 to ground, it passes through the contact arm 20, to switch contact 16, to block or contact 50 of switch 56, through an interconnecting wire on switch 56 to the lead 70 going to contact 69 on key switch 65, through an interconnecting wire 68 to contact 66, then through an interconnecting wire 67 to contact 45 on switch 44 and then through contact arm 46 to ground G. For each position of drum 25, drum 11 completes one revolution, scanning the contacts on switch 15. A predetermined area from drum 11 is transferred to drum 25 corresponding to the drum position on contact arm 20. Upon the completion of each revolution of drum 11 cam 10 on shaft 9 closes contacts 12 and 13, completing the circuit between coil 34 and D. C. source 35. When this circuit is completed solenoid plunger 32 is pulled down against spring 33, and tooth 31 of the ratchet motor 30—32, causing drum 25 to rotate to a new position corresponding to the distance between the contacts on switch 44. With drum 25 at this new position drum 11 continues to rotate and the circuit to the strobotron is completed at a new position of contact arm 20, transferring another area from drum 11 to drum 25. This process is continued until drum 25 has made one complete revolution and a complete strip of graphic material has been transferred from drum 11 to drum 25, each sectional area of which has been mixed according to a predetermined code.

Upon the completion of the rotation of drum 25, the switch arm 46 closes the circuit to contact 85 to the lamp transporting means 86, causing the lamp house to move an amount equal to the width of one column of copy to be transferred. The process above described for transferring areas within a strip or column of copy is repeated, upon completion of which the lamp house is again moved to a new position. This process is continued until the complete copy on drum 11 is transferred, in mixed order, an elemental area at a time, to drum 25. The enciphered copy latent image on drum 25 is developed and fixed and may then be utilized in a standard facsimile transmission system to send an enciphered copy to a distant point. The copy is deciphered by a device similar to the one described which reverses the process herein described.

Each time lamp house 21 is shifted to a new position, the next contact bearing against rod 47, such as contact 49, drops into slot 48 opening the circuit between contacts 49 and 50. The circuit previously opened is closed, closing the circuit through ratchet motor coils 54 and 74, causing ratchet motors 51 and 71 to operate. These ratchet motors operate until the circuit, through their respective coils and switches 62—78—79, comes back to the open contact 49—50. The particular sequence of the circuit is determined by the interconnection and transposition block switch 79 which may be changed to change the code arrangement of the system. This stepping of ratchet motors 51 and 71 changes the sequence of connections between switches 15 and 44 since it changes the position of switches 56 and 65.

In order to start the operation of the system, switch 38 is operated closing contacts 36—37—39, thereby energizing the various ratchet motors. At the end of the scanning process the last contact on rod 47 opens, releasing switch 38 by de-energizing coil 40. The process may be stopped at any time by pressing switch 41—42.

While a system has been described for dividing the copy into four rectangles in each of five strips, generally, a much larger number of divisions will be made since the degree of secrecy attained will be a function of the number of divisions. In practice 50 to 100 columns divided into 50 to 100 parts each have been utilized according to the present invention. The number of contacts and interconnections of the various switches is increased accordingly. It will be evident that the number of different combinations of element positions in the enciphered copy increases rapidly with the number of elements and hence the degree of secrecy attained.

While only one embodiment of the present invention has been shown and described, many variations will be apparent to those skilled in the art within the spirit and scope of the invention as set forth in the appended claim.

What is claimed is:

In a device for making a scrambled copy of graphic material, the combination of, a first rotatable drum for holding copy to be scrambled, a second rotatable drum for receiving images of said copy, an optical system for transferring image areas from said first drum to said second drum, flash-lamp means for illuminating a predetermined area to be transferred, means for rotating said drums and moving said optical system in a predetermined mutual relationship, means for energizing said lamp in a sequence of predetermined mutual positions of said drums and said optical system to transfer scrambled image areas from the first said drum to the second said drum, a plurality of series connected key-block switches for determining the instant of energizing of said lamp with relation to said mutual positions, and means for shifting the positions of said key-blocks upon each energizing of said lamp.

JOHN W. SMITH.

REFERENCES CITED

The following references are of record in the file of this patent:

UNITED STATES PATENTS

| Number | Name | Date |
|---|---|---|
| 1,855,370 | Tremor | Apr. 26, 1932 |
| 2,364,188 | Bryce | Dec. 5, 1944 |
| 2,425,616 | Hallborg | Aug. 12, 1947 |